United States Patent [19]
Dudley et al.

[11] 3,933,323
[45] Jan. 20, 1976

[54] SOLID STATE SOLAR TO MICROWAVE ENERGY CONVERTER SYSTEM AND APPARATUS

[75] Inventors: Kenneth W. Dudley, Sudbury; George H. MacMaster, Lexington, both of Mass.

[73] Assignee: Raytheon Company, Lexington, Mass.

[22] Filed: Mar. 20, 1974

[21] Appl. No.: 453,133

[52] U.S. Cl. .................. 244/1 R; 250/199; 310/4 R; 322/2 R; 331/94.5 R
[51] Int. Cl. ............................................ B64c 39/02
[58] Field of Search ...... 322/2 R; 310/4 R; 321/8 R; 331/DIG. 1, 94.5 R; 250/199; 136/206; 60/26, 203; 244/1 R, 158; 307/312, 311, 278

[56] References Cited
UNITED STATES PATENTS

| | | | |
|---|---|---|---|
| 3,225,208 | 12/1965 | Wolfe | 310/4 X |
| 3,341,708 | 9/1967 | Bilderback | 331/DIG. 1 |
| 3,434,678 | 3/1969 | Brown et al. | 244/158 |
| 3,467,840 | 9/1969 | Weiner | 310/4 |
| 3,535,543 | 10/1970 | Dailey | 310/4 X |
| 3,781,647 | 12/1973 | Glaser | 310/4 X |

*Primary Examiner*—Trygve M. Blix
*Assistant Examiner*—Paul E. Sauberer
*Attorney, Agent, or Firm*—Edgar O. Rost; Joseph D. Pannone; Harold A. Murphy

[57] ABSTRACT

Solid state spaced-oriented means convert solar radiation into microwave energy which is amplified and beamed to earth as a source of electrical power. A large number of semiconductor devices operating in the current multiplication region are irradiated by single mode coherent light beam generation means which is pumped by solar energy. A neodymium yittrium aluminum iron garnet laser or CW gallium arsenide junction diode laser mode-locked at a predetermined microwave frequency, such as 3,000 MHz provide for generation of a light beam. The generated current is directly proportional to the radiant energy and is coupled from the semiconductor device array to antenna means for transmission to earth stations for conversion into low frequency electrical energy.

6 Claims, 3 Drawing Figures

SOLID STATE SOLAR TO MICROWAVE ENERGY CONVERTER SYSTEM AND APPARATUS

BACKGROUND OF THE INVENTION

1. Field of the Invention

The invention relates to a system and apparatus for conversion of solar radiation into microwave energy in space and conversion into low frequency electrical power utilizing solid state devices.

2. Description of the Prior Art

Conversion of microwave energy to low frequency electrical power has been disclosed in prior art embodiments utilizing antenna-rectifier arrays comprising a large number of devices, such as solid state devices, to propel space vehicles. U.S. Pat. No. 3,434,678 issued Mar. 25, 1969 to W. C. Brown et al and assigned to the assignee of the present invention provides an embodiment of a helicopter-type space vehicle which is self-supporting by means of microwave energy beamed into space and converted to electrical power for operation of an electric motor. Microwave energy is defined an electromagnetic energy in that portion of the spectrum having wavelengths in the order of 1 meter to 1 millimeter and frequencies in excess of 300 MHz. Such energy is preferred for wireless transmission since it is desirable to focus the transmitted energy with a relatively high power density upon a small area spaced from the source. In accordance with the laws of optics, the sharpness of a microwave beam varies as the ratio of antenna dimensions to the wavelength of the transmitted energy. Accordingly, for a given predetermined power density and beam sharpness, the very short wavelengths of microwave frequency oscillations facilitates a corresponding decrease in the dimensions of the antenna means for transmitting and receiving. In addition, in long wave or radio-type transmission, difficulties are encountered as a result of natural or man-made interference and noise and this problem is considerably less significant with the transmission of microwave frequencies. The recent United States space programs have shown that the employment of very short microwaves for beamed energy is preferable for penetration of certain atmospheric reflection layers, as well as, the advantages of accurate focusing and high power density of the transmitted energy.

Other examples of the utilization of microwave energy for space applications are found in U.S. Pat. No. 3,174,705, issued Mar. 23, 1965 to D. Shiff et al, as well as U.S. Pat. No. 3,083,528 issued Apr. 2, 1963 and U.S. Pat. No. 3,114,517, issued Dec. 17, 1963 to W. C. Brown. All of these are also assigned to the assignee of the present invention and disclose various conversion means utilizing heat exchangers for conversion of microwaves into electrical energy or heat which can be utilized for directly or indirectly propelling a space vehicle.

The current energy crisis throughout the world due to the growing shortage of fossil fuels, namely coal, oil and natural gas due to increases in the level of consumption and the decline in available resources has led to the search for new sources of energy. The use of solar energy has been proven in the space program to provide for electric power aboard the spacecraft. In addition, numerous attempts have been made on the earth to collect and convert solar energy into useful electrical power. An embodiment of a means for conversion of solar radiation in space into microwave energy utilizing a satellite system, including means for transmission to earth stations and conversion to electrical power is disclosed in U.S. Pat. No. 3,781,647, issued Dec. 25, 1973 to P. E. Glaser. The satellite system includes several geostationary satellites positioned in an energy receiving relationship to the sun. The solar energy conversion means include guidance and control means to correctly orient the collector means in relationship to the sun. The solar energy conversion means convert the radiation received into DC electrical energy which is subsequently utilized to operate high power generators of microwave energy for transmission by means of a focused beam to collection means on earth.

Solar energy offers an almost unlimited source for man's energy needs with the economics playing the most significant role in its utilization. In recent years solid state lasers and semiconductor devices for conversion of radiant energy into electrical energy have achieved very high efficiencies. Such semiconductors include PN silicon junction diodes which can be electrically biased to operate in the current multiplication region and the generated current then becomes directly proportional to the quanta of impinging light energy. The present invention describes a unique system and apparatus for generation of microwave energy from solar radiation in space applications utilizing controlled coherent light beams and semiconductor electrical conversion means.

SUMMARY OF THE INVENTION

In accordance with the present invention a system with apparatus utilizing solid state devices is provided for conversion of solar radiation into microwave energy and transmission to an earth station for conversion into electrical power. A large number of semiconductor devices are utilized in a phased array as electrical energy converters of a controlled frequency coherent laser beam irradiating the semiconductor array. Since microwave energy is desired for wireless transmission to earth a frequency of approximately 3,000 MHz is preferred. Pulsed coherent light energy from a solar energy pumped laser at this frequency when irradiating a large phased array of reverse-biased semiconductor diodes results in microwave power which is directly proportional to the quantra of light striking the semiconductor devices. The output current and power is modulated by the modulation on the laser beam. Solid state devices today operate at efficiencies as high as 80 to 90 percent. Mode-locking of the laser beam is achieved through the use of such devices as the neodymium-YAIG or continuous wave gallium arsenide diode junction lasers.

The output of the phased array of semiconductor devices is transmitted to an antenna for transmission to the earth station where the energy is converted into low frequency electrical power. The controlled phase irradiation of the large semiconductor device phased array planar antenna is accomplished by a means of a lens system and fiber optics to compensate for bending or flexing of the planar antenna. Phase coherency of the relatively stable outputs generated by the system in energy beamed to earth is a feature of the embodiment of the invention.

BRIEF DESCRIPTION OF THE DRAWINGS

The invention will now be described in the following detailed specification with reference directed to the accompanying drawings, wherein.

DESCRIPTION OF THE PREFERRED EMBODIMENT

Figure 1:
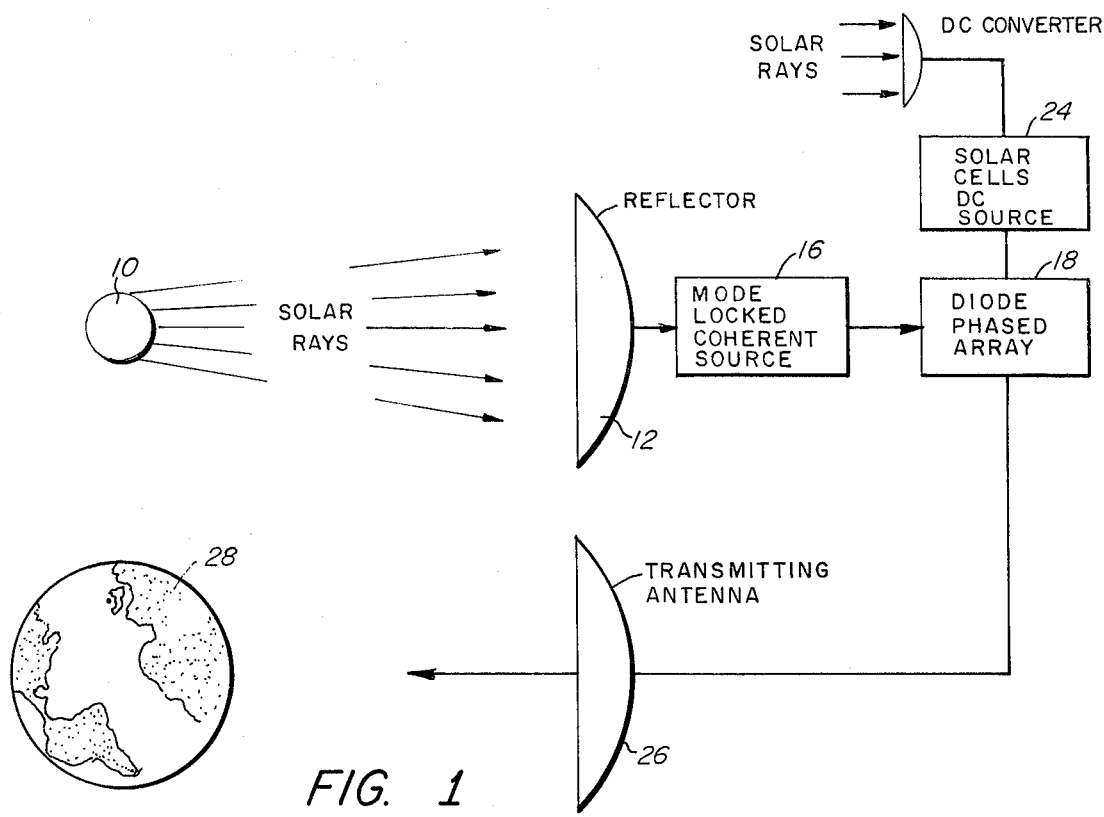
FIG. 1 is a diagrammatic view of the embodiment of the system of the invention.

The system and space power station apparatus embodying the invention is illustrated in FIG. 1. A solar energy source 10 provides solar rays impinging on the reflector 12 of, illustratively, a Cassigranian-type antenna which is shown in detail in FIG. 2. Auxiliary concentrator 14 at approximately the focal point provides the primary source of solar energy for pumping a coherent radiant energy beam generation means 16, preferably a mode-locked laser. Such beam generation means include a neodymium-yittrium aluminum iron garnet rod laser providing a mode-locked pulse output at, illustratively, a specific microwave frequency of 3,000 MHz. Approximately 25 watts of solar energy are required for the pumping of the coherent beam generation means 16 and the pulsed output beam 22 irradiates a phased array of a large number of semiconductor devices 18. A variety of methods using intercavity modulation techniques are available to permit continuously pumped optical beam generators to be repetitively pulsed. Such techniques are generally referred to as mode-locking. The output of the coherent beam generation means 16 is a series of very narrow mode-locked pulses which, illustratively have a repetition frequency of $f = (c/2l)$, where $l$ is the length of the modulation means. The pulse which is in the order of $L/C$ where $L$ is the length of the laser rod which corresponds to a mode-locked pulse width of 0.03 nanosecond for a 1 centimeter long rod. With a 2 percent efficiency for the neodymium-YAIG laser, a 0.5 watts input produces a 10 milliwatt output.

Other coherent beam means 16 include the recently developed junction lasers in which the laser action is produced by a high, nonequilibrium concentration of electrons and holes within a small region of a semiconductor crystal material. Mirrors form an integral part of the laser structure and may be formed by cleaving the crystal. Pulsed juncture lasers have now operated at as high as 40 percent external quantum efficiency. Continuous outputs of approximately 40 milliwatts have been obtained at room temperatures with even higher powers at low temperatures. Further details regarding this alternative apparatus involving solid state materials, such as Group III–V compounds and IV–VI compounds will be found in an article entitled "Junction Lasers" by L. A. D'Asaro and J. E. Ripper, Physics Today, March 1971, pps. 42–48 inclusive.

Figure 2:
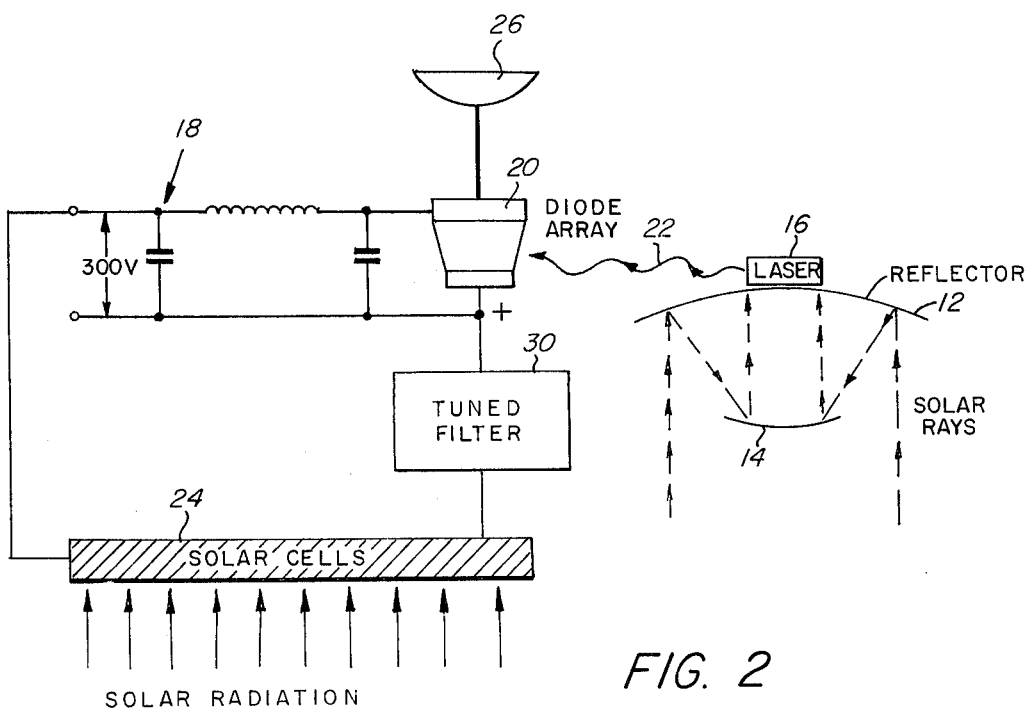
FIG. 2 is a partial schematic view of the solar energy collection and microwave energy conversion portion of the system of the invention.

The output coherent optical beam 22 irradiates a large number of solid state semiconductor devices, such as reversed-bias PN silicon junction diodes 20, disposed in a phased array 18 on the space power station. The details of the circuitry associated with an individual semiconductor device 20 is illustrated in FIG. 2. Preferably, the phased diode array operates as a Class "C" power amplifier with each of the semiconductor diodes being reversed-biased in a current multiplication region so that the current output is directly proportional to the quanta of the radiant energy in the optical beam impinging on the diodes. The output current and power of the phased diode array will follow the modulation on the light beam 22. Illustratively, with a 10 milliwatt pulsed input from the mode-locked means 16, the current flowing from each diode with anticipated gain of 40dB and efficiency of approximately 80 percent, would be 100 watts continuous wave energy at 3,000 MHz.

The phased array 18 is provided with DC reverse-biasing means, such as an array of solar cell converters 24 which may be of the photovoltaic, thermionic or thermoelectric type. Examples of the photovoltaic type include, but are not limited to, cadmium sulphide cells, NP silicon cells, gallium arsenide solar cells, as well as organic film solar cells. Examples of the thermionic type include high vacuum and plasma diodes. Examples of the third, or thermoelectric type, include bimetallic junctions displaying the Seebeck effect. Further details on such DC electrical energy conversion means is available in the hereinbefore referenced U.S. Pat. No. 3,781,647. The combined output of the semiconductor diode array of, illustratively, 100 watts CW per diode is transmitted by means of transmitting antenna 26 to a receiving station on earth 28 for reception of the microwave energy and conversion to low frequency electrical power. A tuned filter 30 between the DC solar energy converter means 24 and diodes 20 will assure the direction of substantially all of the microwave energy to antenna 26.

All of the aforementioned apparatus is preferably carried on a space power station, which may be manned or unmanned, and conventional guidance means, such as sun sensors, star trackers, and horizon seekers or other known components for control of such space-oriented vehicles, would be included in the station. In addition, any protective devices, such as means for protecting the sensitive solar cells, and appropriate cooling systems for the operation of the station at the very high temperatures involved with the collection of the solar energy would also be required aboard the space power station.

Figure 3:
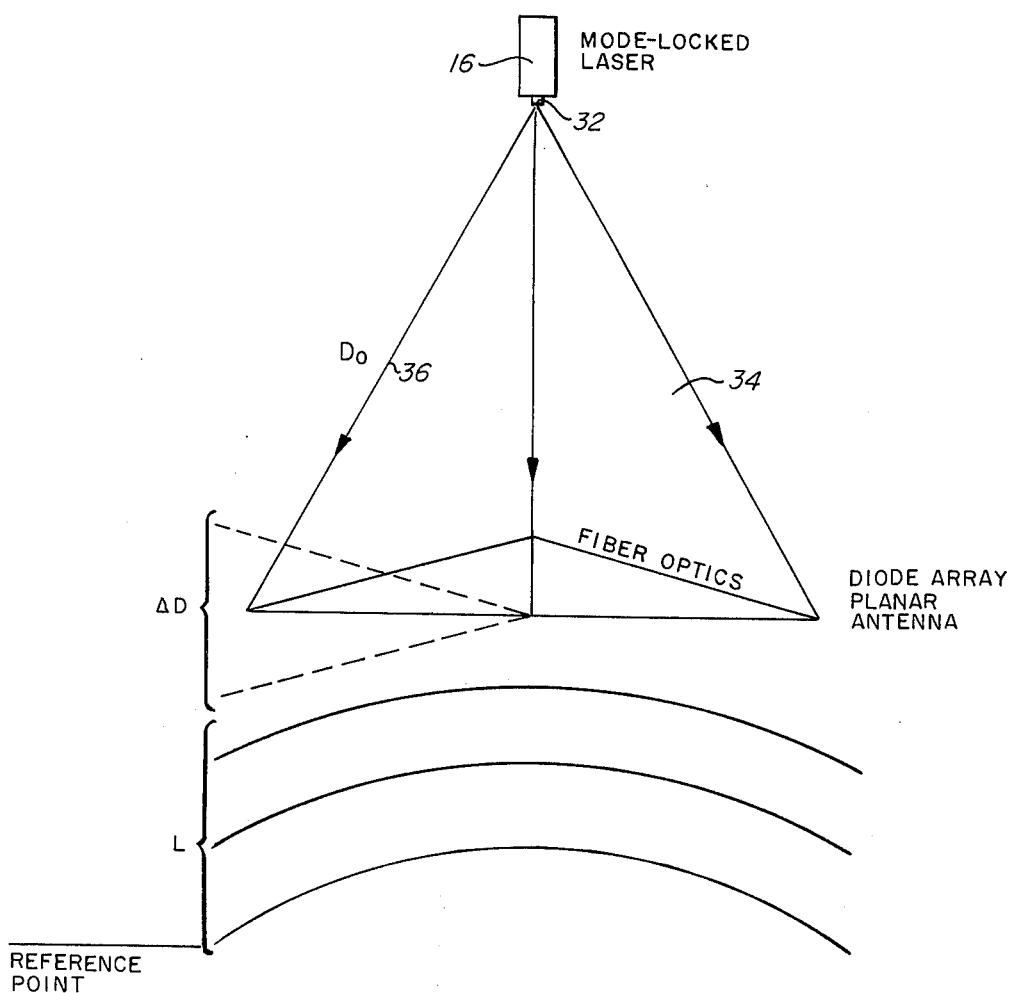
FIG. 3 is a diagrammatic representation of the feature of the system relating to phase compensation of the coherent radiant energy beam generating apparatus.

Since a large number of solid state semiconductor microwave energy generators are utilized, the phase synchronization between each of the individual components is extremely critical. Referring now to FIG. 3, a system for maintaining phase compensation with respect to a phased diode array 18 planar antenna having a relatively large number of semiconductor microwave power generators, irradiated by mode-locked means 16, includes a lens system 32 and optical fiber means 34. Typically, such an antenna array is required to be rigid so that the phase of the combined output power of the semiconductor devices is in the proper phase for aiming to earth via the transmitting antenna 26. To compensate for the bending or flexing of the planar antenna, it is possible to provide a method of compensation by using the principle that the velocity of the light waves and microwaves are essentially the same. Any deviation from a reference point is designated L for a beam indicated by the line 36 emitted from the mode-locked means 16. For proper phase coherence at reference point L, the distance $D$ from the antenna surface to the laser means 16, together with $\Delta D$ which represents a change in the antenna surface, is considered. $D + L +$ (fiber optic delay $< 2\pi$) = proper phase coherence at point L. For light rays $$\frac{(D \pm \Delta D)}{C_L}$$

For microwave energy the equation is $$\frac{(L \mp \Delta D)}{C_{\mu\omega}}$$

Since the light and microwave wave velocities are substantially equal the sum of these two equations will equal $$\frac{D + L}{C} = \text{proper phase coherency.}$$

Numerous other phase compensation and phase shifting means may be incorporated in the structure and programmed computerized control may also be utilized in conjunction with the laser lens and fiber optics system.

There is thus disclosed a unique system and apparatus for the conversion of solar radiation into microwave energy for transmission to earth and conversion into electrical power by utilizing solid state solar energy pumped coherent optical beam sources for irradiating solid state semiconductor generator means in a phased array system. The phase coherency feature of the beam generation means and substantially complete isolation of the semiconductor drive means will assure a high degree of stability of the generated microwave energy signals. With continued improvements resulting from space programs, numerous modifications, alterations and variations will be evident to those skilled in the art. The foregoing description of an illustrative embodiment, therefore, is to be considered in its broadest aspects and not in a limiting sense.

We claim:

1. A system for converting solar energy into microwave energy comprising in combination;
    a source of solar energy radiation;
    means for collecting said solar energy operatively associated with a pulsed coherent radiant energy mode-locked laser beam source operative at a fixed predetermined microwave energy frequency;
    solid state semiconductor amplifier means adapted to be irradiated by said radiant energy laser beam to generate an amplified microwave energy output at substantially said predetermined frequency; and
    means for transmitting said amplified microwave energy to a utilization load.

2. The system according to claim 1 wherein said coherent beam source comprises a neodymium yittrium aluminum iron garnet material laser.

3. The system according to claim 1 wherein said coherent beam source comprises a semiconductor material PN junction laser.

4. The system according to claim 1 wherein said solid state semiconductor means comprise a phased array of a plurality of interconnected electrically reversed-bias PN junction silicon diode operating in the current multiplication region.

5. The system according to claim 4 wherein said semiconductor diodes are electrically biased by a voltage source comprising an array of solar energy to DC electrical energy conversion means.

6. The system according to claim 1 wherein said solar energy collection means, coherent beam source, solid state semiconductor amplifier means and said microwave energy transmitting means are oriented in outer space and said utilization load comprises energy receiving and electrical power conversion means on earth.

\* \* \* \* \*